United States Patent [19]

Royle

[11] 4,290,901
[45] Sep. 22, 1981

[54] DEMULSIFIER FOR INCLUSION IN INJECTED ACIDIZATION SYSTEMS FOR PETROLEUM FORMATION STIMULATION

[75] Inventor: Rae A. Royle, Houston, Tex.

[73] Assignee: Texaco Inc., White Plains, N.Y.

[21] Appl. No.: 88,437

[22] Filed: Oct. 26, 1979

[51] Int. Cl.$^3$ ............................................. E21B 43/27
[52] U.S. Cl. ................................. 252/8.55 C; 166/307
[58] Field of Search ................. 252/8.55 C, 340, 342; 166/307

[56] References Cited

U.S. PATENT DOCUMENTS

| | | | |
|---|---|---|---|
| 2,314,022 | 3/1943 | Stone | 252/8.55 |
| 2,663,689 | 12/1953 | Kingston et al. | 252/8.55 |
| 3,252,904 | 5/1966 | Carpenter | 252/8.55 |
| 3,711,405 | 1/1973 | Pye et al. | 252/8.55 |
| 4,107,057 | 8/1978 | Dill et al. | 252/8.55 |

*Primary Examiner*—Herbert B. Guynn
*Attorney, Agent, or Firm*—Carl G. Ries; Robert A. Kulason; Jack H. Park

[57] ABSTRACT

The formation of stable oil-in-water emulsions in produced fluids from wells undergoing acidization treatment is prevented by the inclusion within the injected acidization chemical mixture of a long chain carboxylic acid ester of a polyhydric alcohol such as sorbitan monolaurate, sorbitan monopalmitate or sorbitan monooleate as a demulsification agent.

5 Claims, No Drawings

DEMULSIFIER FOR INCLUSION IN INJECTED ACIDIZATION SYSTEMS FOR PETROLEUM FORMATION STIMULATION

BACKGROUND OF THE INVENTION

1. Field of the Invention

This invention relates to a demulsification process. More particularly, this invention relates to a demulsification agent which is included in a chemical mixture comprising conventional petroleum formation acidization-stimulation chemicals and the demulsification agent, said chemical mixture being injected into the petroleum formation with the effect of the demulsification agent being to prevent formation of stable oil-in-water emulsions in the produced fluids from the well.

2. Description of the Prior Art

Acidization treatments are commonly performed in oil wells which penetrate subterranean petroleum reservoirs. In these treatments acid solutions comprising mixtures of both hydrochloric and hydrofluoric acid as well as other ingredients are injected under pressure into the subterranean reservoir in order to improve the porosity and permeablity of the rock formation so as to increase the amount of petroleum that can be extracted from the well. These treatments are quite common and very effective. However, they are not without associated problems.

One of the most significant problems created by the acidization treatment is the subsequent formation of very stable oil-in-water emulsions in the produced fluids from the well. Studies have indicated that the most stable of emulsions are formed from spent mud acid and materials simulating formation fines. Less stable in order of decreasing emulsion stability are emulsions formed from spent mud acid alone, unspent mud acid, and unspent hydrochloric acid. Most commonly crude oil and formation water alone do not show significant emulsification tendencies.

The most stable emulsions were formed in conjunction with formation fines. The creation of fines by the acidization of sandstone formations with mixed hydrofluoric-hydrochloric acid is well established in the literature. Also, the ability of solid materials to stabilize emulsions is well recognized. The acidization process then seems to create formation fines by a partial disintegration of the formation matrix. The fines so created are somehow made partially oil wet in the acidization process and, because of this mixed wettability, are capable of stabilizing emulsions of many types of crude oils and produced water.

These stable emulsions are not susceptible to conventional oil field demulsification methods such as the treatment of the produced fluids in settling tanks and heater treaters even in conjunction with conventional demulsification agents.

Handling of these stable emulsions present a particular problem in centralized produced fluids treatment facilities which process the production from a great number of wells by continuous separation of the combined produced fluids into clean oil and water streams. Introduction of these stable emulsions into this type of treatment facility can cause massive upsets. When these facilities become filled with emulsions, the result is either curtailment of production from the producing wells or introduction of wet oil into the crude oil pipelines leaving the treatment facility.

Curtailment of production has several adverse consequences. Not only is production lost during the period of curtailment, but often a certain percentage of the wells will sand up or fail to return to production after being shut in. Thus, the immediate loss of current production is only a part of the economic loss. The cost of workovers and in some cases, permanent loss of producing capacity is often a more significant cost of such curtailments. Shipping of wet oil from the treatment plant through the outlet crude oil pipeline is also an unattractive alternative. Commonly the downstream users of the crude oil stream are not prepared to handle high water levels within the crude oil stream and severe upsets will occur in their facilities as well.

Two different methods have been disclosed to deal with the problems created by the presence of these stable emulsions resulting from acid stimulation treatments in these wells. One method is to isolate the produced fluids from the treated well until such time as the stable emulsions are no longer being produced from the well. Such isolated fluids are then treated separately. An other method is to introduce an effective demulsification agent which will specifically combat the stable emulsions formed by the spent mud acids and formation fluids either into the acid treatment solution as it is injected into the well initially or to introduce this same demulsifier into the produced fluid stream from the acidized well.

SUMMARY OF THE INVENTION

A demulsifier selected from the group consisting of the long chain carboxylic acid esters of polyhydric alcohols is added to the acidizing solution in an acidization process wherein the acidizing solution comprises hydrochloric and hydrofluoric acids which are injected through a well into a subterranean petroleum formation.

DESCRIPTION ON THE PREFERRED EMBODIMENT

I have discovered that the long chain carboxylic acid esters of polyhydric alcohols are very effective demulsifiers which are useful in treating stable emulsions formed from crude oil water, spent mud acid, and formation fines. Preferred demulsifiers include sorbitan monolaurate, sorbitan monopalmitate, and sorbitan monooleate.

A series of experiments was run testing the effects of sorbitan monopalmitate, here marketed as Span 40® manufactured by ICI Americas, Inc., as a suspension in both Texaco Aromatic Solvent® (TAS) and Isopropyl Alcohol (IPA). The demulsification effects of Span 40 chemical were tested on emulsions formed between a southern Louisiana crude oil and spent mud acid (12% hydrochloric acid plus 3% hydrofluoric acid). The Span 40 chemical was tested at 1, 5, and 10 volume percent strengths utilizing both the TAS and IPA carrier fluids. The results of these tests are reported in Table I below and indicate that sorbitan monopalmitate is a very effective demulsification agent for this usage.

TABLE I

| Demulsifier Solution Composition[1] | Crude Oil[2] (ml.) | Brine[3] (ml.) | Spent Mud[4] Acid (ml.) | % Breakout[5] at: | | | | |
|---|---|---|---|---|---|---|---|---|
| | | | | 15 min | 30 min | 60 min | 120 min | 24hrs. |
| 0.0% Span 40® | 37.5 | 12.5 | — | 73 | 77 | 81 | 85 | 94 |
| 0.5 ml. TAS, 0.0% Span 40® | 37.5 | 2.5 | 10.0 | — | — | — | — | T |
| 0.5 ml. TAS, 0.0% Span 40® Control | 37.5 | — | 12.5 | — | — | T | T | T |
| 0.5 ml. IPA, 0.0% Span 40® Solutions | 37.5 | 2.5 | 10.0 | — | — | T | T | T |
| 0.5 ml. IPA, 0.0% Span 40® | 37.5 | — | 12.5 | T | T | T | T | T |
| 0.5 ml. TAS, 0.01% Span 40® | 37.5 | 2.5 | 10.0 | T | T | T | 86 | 99 |
| 0.5 ml. TAS, 0.01% Span 40® | 37.5 | — | 12.5 | T | T | T | 80 | 88 |
| 0.5 ml. TAS, 0.05% Span 40® | 37.5 | 2.5 | 10.0 | 16 | 59 | 78 | 86 | 94 |
| 0.5 ml. TAS, 0.05% Span 40® | 37.5 | — | 12.5 | 58 | 70 | 74 | 85 | 93 |
| 0.5 ml. TAS, 0.10% Span 40® | 37.5 | 2.5 | 10.0 | T | T | 20 | 64 | 96 |
| 0.5 ml. TAS, 0.10% Span 40® | 37.5 | — | 12.5 | 4 | 4 | 12 | 75 | 95 |
| 0.5 ml. IPA, 0.01% Span 40® | 37.5 | 2.5 | 10.0 | — | — | — | 90 | 98 |
| 0.5 ml. IPA, 0.01% Span 40® | 37.5 | — | 12.5 | — | — | — | 93 | 96 |
| 0.5 ml. IPa, 0.05% Span 40® | 37.5 | 2.5 | 10.0 | 31 | 77 | 81 | 85 | 92 |
| 0.5 ml. IPA, 0.05% Span 40® | 37.5 | — | 12.5 | 45 | 68 | 68 | 87 | 91 |
| 0.5 ml. IPA, 0.10% Span 40® | 37.5 | 2.5 | 10.0 | 19 | 54 | 62 | 81 | 92 |
| 0.5 ml. IPA, 0.10% Span 40® | 37.5 | — | 12.5 | 8 | 8 | 8 | 81 | 92 |

[1]Span 40® percentages are ml. Span 40®/ml. emulsion.
[2]Crude Oil is from West Cote Blanche Bay Field, Louisiana.
[3]Brine id from wellhead production in the West Cote Blanche Bay Field.
[4]Spent Mud Acid Composition: 12% H Cl + 3% HF.
[5]Samples held at room temperature for one hour, then put in 120° F. water both.

As mentioned herein before, it is preferred that the demulsifing agent be added to an otherwise conventional acidizing solution before it is injected into a well. Addition of the demulsifier at this stage will serve to almost entirely prevent formation of the undesirable stable emulsions between the produced crude oils and the spent mud acid since the demulsifier will be present in the formation from the very outset of the acidization process. Since emulsion formation is largely prevented at its very source, the need for post production demulsification treatments will be greatly diminished and in most cases eliminated.

The demulsifing agents are the long chain carboxylic acid esters of polyhydric alcohols. The preferred demulsifing agents are sorbitan monolaurate, sorbitan monopalmitate, and sorbitan monooleate. It is anticipated that the experienced practitioner in the field will determine the most efficient concentration level for the specific demulsifing agent employed by conventional bench testing procedures.

The above described embodiments are presented for the purpose of illustration of the practice of the best mode of the method of this invention and should not be considered as limitative. Further modification will be apparent to those skilled in the art. Such modifications are included within the scope of this invention as defined by the following claims.

I claim:

1. In an acidization process wherein an aqueous acidizing solution comprising hydrochloric and hydrofluoric acids is injected through a well into a subterranean petroleum formation, the improvement comprising the addition to the acidizing solution of an effective amount of a demulsifier selected from the group consisting of sorbitan monolaurate, sorbitan monopalmitate, sorbitan monooleate, and mixtures thereof.

2. The process of claim 1 wherein the demulsifier is sorbitan monopalmitate.

3. The process of claim 1 wherein the demulsifier ranges in concentration from about 0.05 to about 2.0 volume percent of the total injected solution comprising the acidizing solution and the demulsifier.

4. The method of claim 3 wherein the demulsifier ranges in concentration from about 0.05 to about 2.0 volume percent of the total injected solution comprising the acidizing solution and the demulsifier.

5. An acidizing process for treating a subterranean earth formation comprising injecting into a well in contact with said formation an aqueous acidizing solution consisting essentially of hydrochloric acid, hydrofluoric acid, and an effective amount of a demulsifier selected from the group consisting of sorbitan monolaurate, sorbitan monopalmitate, sorbitan monooleate, and mixtures thereof.

* * * * *